(12) United States Patent
Nakawaki

(10) Patent No.: US 8,520,241 B2
(45) Date of Patent: Aug. 27, 2013

(54) IMAGE PROCESSING APPARATUS AND CONTROL METHOD THEREOF

(75) Inventor: Jun Nakawaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 377 days.

(21) Appl. No.: 12/910,732

(22) Filed: Oct. 22, 2010

(65) Prior Publication Data

US 2011/0116127 A1 May 19, 2011

(30) Foreign Application Priority Data

Nov. 18, 2009 (JP) ................................. 2009-263344

(51) Int. Cl.
*G06F 15/00* (2006.01)

(52) U.S. Cl.
USPC ........................................................ 358/1.15

(58) Field of Classification Search
USPC ............................................... 358/1.15, 474
See application file for complete search history.

(56) References Cited

U.S. PATENT DOCUMENTS

| 7,382,479 B2 | 6/2008 | Hirose et al. | |
| 2008/0201617 A1* | 8/2008 | Ohara et al. | ..................... 714/57 |
| 2010/0157384 A1* | 6/2010 | Wu et al. | ....................... 358/474 |

FOREIGN PATENT DOCUMENTS

JP 2004-151893 A 5/2004

* cited by examiner

*Primary Examiner* — Saeid Ebrahimi Dehkordy
(74) *Attorney, Agent, or Firm* — Fitzpatrick, Cella, Harper & Scinto

(57) ABSTRACT

The present invention provides an image processing apparatus in which when a change is made to the functions of apparatuses that execute a cooperative processing flow, the definition of the cooperative processing flow is changed and executed without requiring the user to perform complicated tasks, and a control method thereof. To accomplish this, the image processing apparatus of the present invention confirms, before starting execution of processing in accordance with a cooperative processing flow in which a procedure of cooperative processing performed in cooperation with a plurality of external apparatuses has been defined in advance, whether or not each of a plurality of functions included in the flow is executable by each predefined external apparatus of the plurality of external apparatuses. Furthermore, the image processing apparatus changes the definition of the cooperative processing flow based on the confirmation result and starts to execute the changed flow.

8 Claims, 14 Drawing Sheets

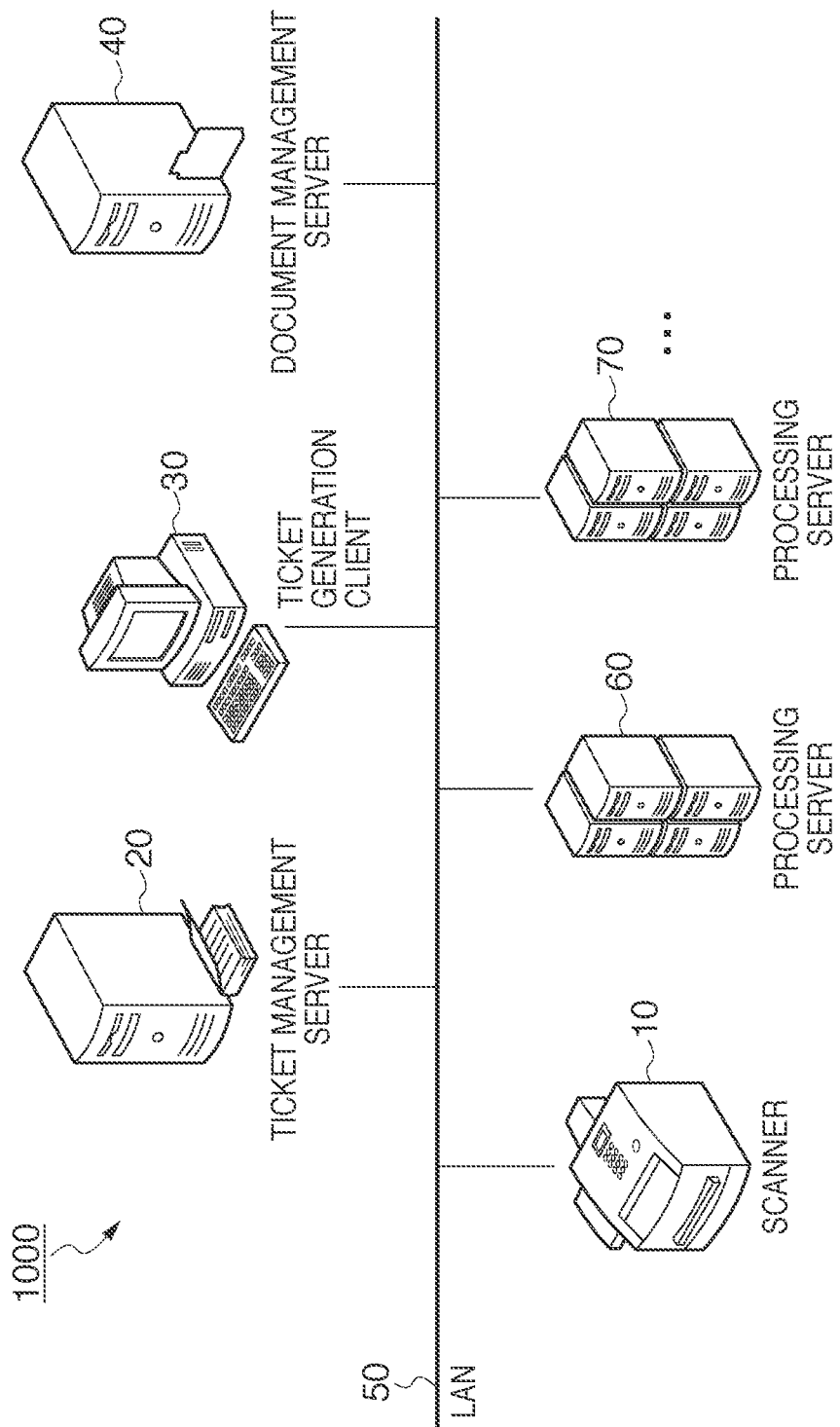

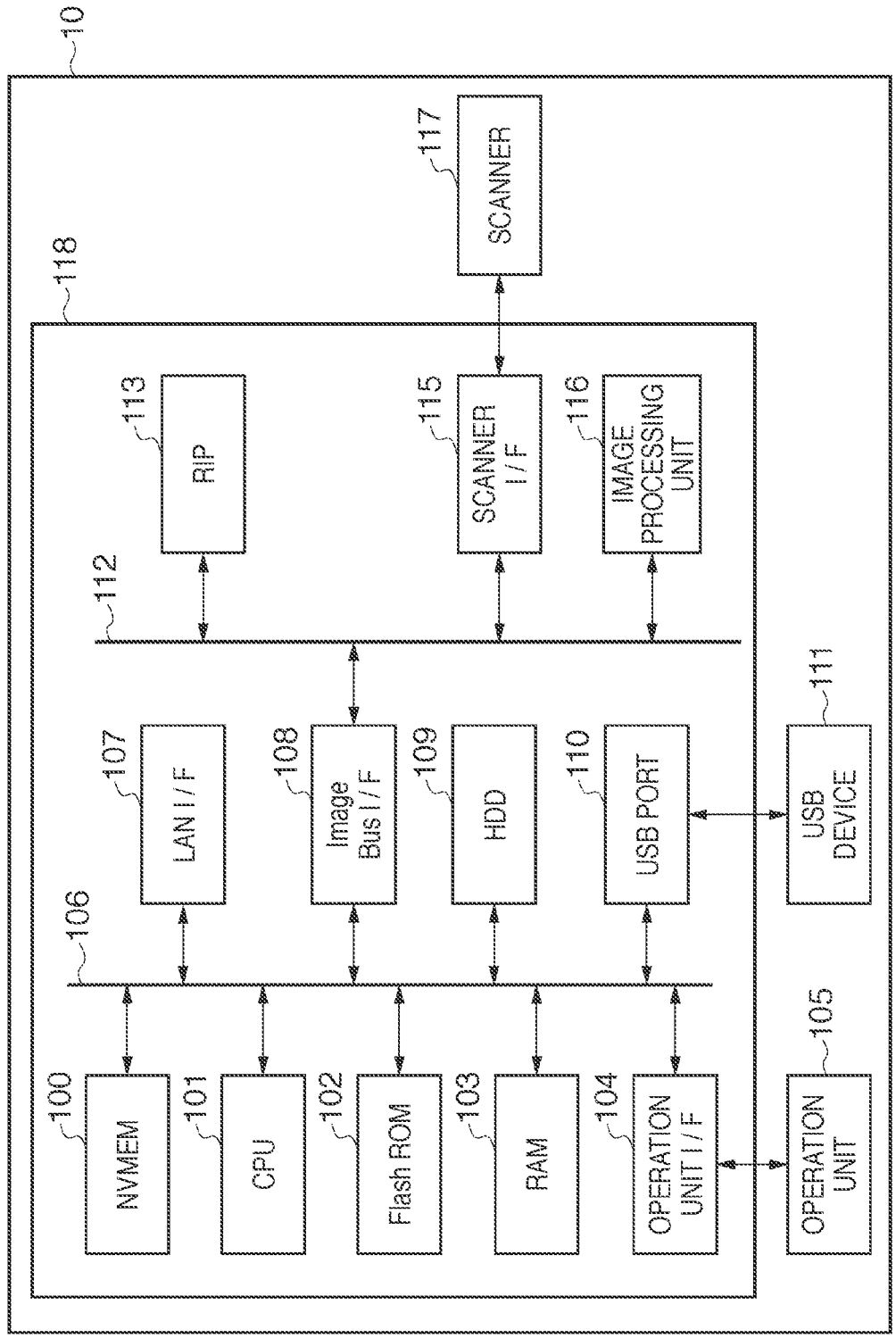

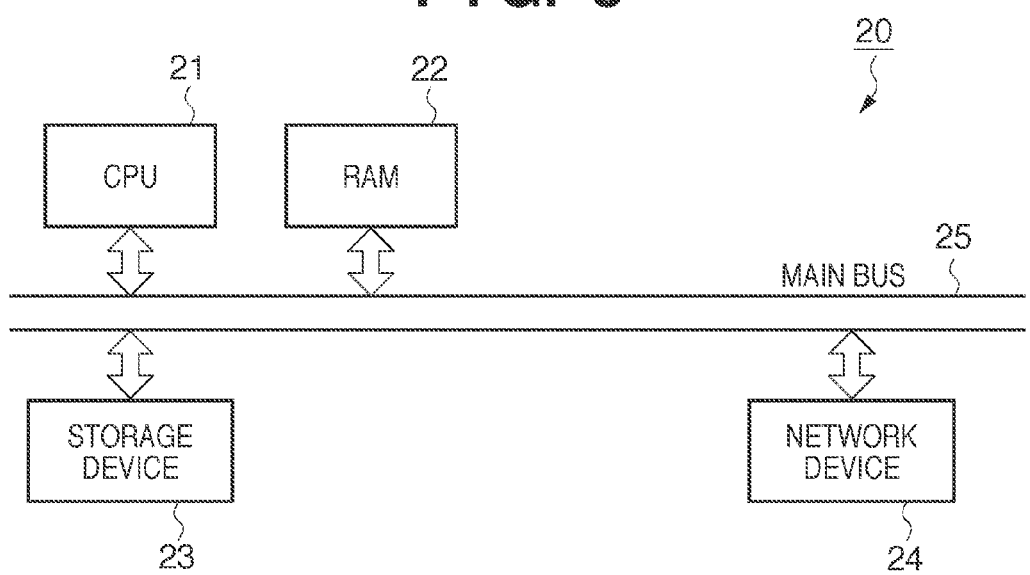
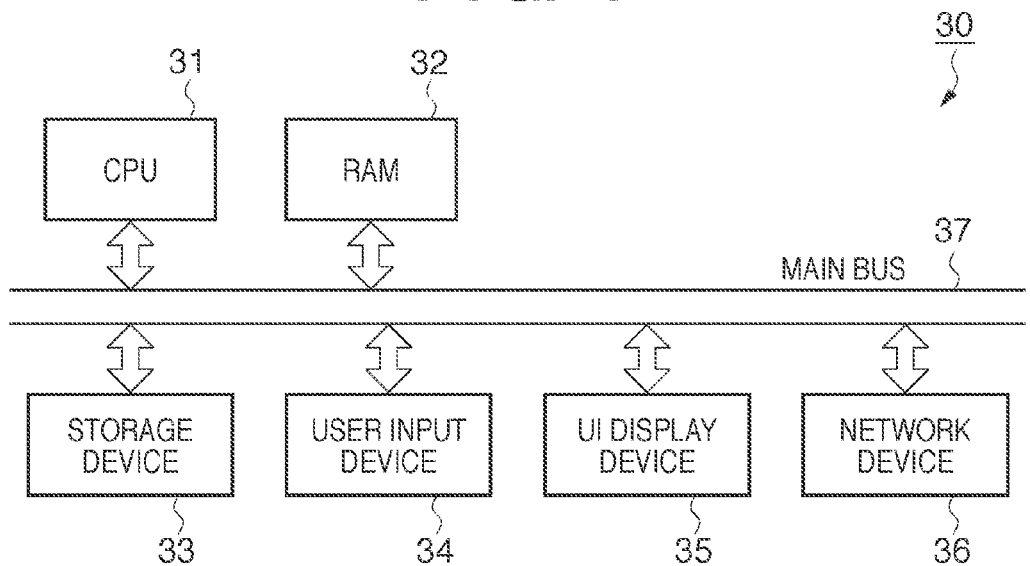

FIG. 5

```xml
<?xml version="1.0" encoding="utf-8"?>
<ScanProcess Id="123" Caption="MyProcess" Comment="Save to my folder on server">
  <ScanConfiguration id="1">
    <ColorMode>Full Color</ColorMode>
    <Resolution line="X">300</Resolution>
    <Resolution line="Y">300</Resolution>
    <Duplex>Book</Duplex>
  </ScanConfiguration>
  <ImagingProcess>
    <Process id="1" Name="FileCover" ServerID="AAA" ServerURL="http://aaa.com/imgprocessor/fileconvert/">
      <Param kind="FileFormat">pdf</Param>
    </Process>
    <Process id="2" Name="OCR" ServerID="BBB" ServerURL="http://bbb.com/imgprocessor/ocr/">
      <Param kind="Language">japanese</Param>
    </Process>
    <Process id="3" Name="Destination" ServerID="BBB" ServerURL="http://bbb.com/imgprocessor/dest/">
      <Param>Destination</Param>
    </Process>
  </ImagingProcess>
  <Destination id="1">
    <URI protocol="WebDAV">http://docserver.com/myfolder/</URI>
  </Destination>
  <DocumentProperty>
    <DocumentName>Scanned Document</DocumentName>
  </DocumentProperty>
</ScanProcess>
```

FIG. 6

```xml
<?xml version="1.0" encoding="utf-8"?>
<ScanProcess id="123" Caption="MyProcess" Comment="Save to my folder on server">
  <ScanConfiguration id="1">
    <ColorMode>Full Color</ColorMode>
    <Resolution line="X">300</Resolution>
    <Resolution line="Y">300</Resolution>
    <Duplex>Book</Duplex>
  </ScanConfiguration>
  <ImagingProcess>
    <Process id="1" Name="FileCovert" ServerID="AAA" ServerURL="http://aaa.com/imgprocessor/fileconvert/">
      <Param kind="FileFormat">pdf</Param>
      <Statuses>
        <Status id="1" ServerID="AAA" ServerURL="http://aaa.com/imgprocessor/fileconvert/">available</Status>
      </Statuses>
    </Process>
    <Process id="2" Name="OCR" ServerID="BBB" ServerURL="http://bbb.com/imgprocessor/ocr/">
      <Param kind="Language">japanese</Param>
      <Statuses>
        <Status id="1" ServerID="AAA">not install</Status>
      </Statuses>
    </Process>
    <Process id="3" Name="Destination" ServerID="BBB" ServerURL="http://bbb.com/imgprocessor/dest/">
      <Param>Destination</Param>
      <Statuses>
        <Status id="1" ServerID="AAA">not install</Status>
      </Statuses>
    </Process>
  </ImagingProcess>
  <Destination id="1">
    <URI protocol="WebDAV">http://docserver.com/myfolder/</URI>
  </Destination>
  <DocumentProperty>
    <DocumentName>Scanned Document</DocumentName>
  </DocumentProperty>
</ScanProcess>
```

```xml
<?xml version="1.0" encoding="utf-8"?>
<ScanProcess id="123" Caption="MyProcess" Comment="Save to my folder on server">
  <ScanConfiguration id="1">
    <ColorMode>Full Color</ColorMode>
    <Resolution line="X">300</Resolution>
    <Resolution line="Y">300</Resolution>
    <Duplex>Book</Duplex>
  </ScanConfiguration>
  <ImagingProcess>
    <Process id="1" Name="FileCovert" ServerID="AAA" ServerURL="http://aaa.com/imgprocessor/fileconvert/">
      <Param kind="FileFormat">pdf</Param>
      <Statuses>
        <Status id="1" ServerID="AAA" ServerURL="http://aaa.com/imgprocessor/fileconvert/">available</Status>
        <Status id="2" ServerID="BBB">not install</Status>
      </Statuses>
    </Process>
    <Process id="2" Name="OCR" ServerID="BBB" ServerURL="http://bbb.com/imgprocessor/ocr/">
      <Param kind="Language">japanese</Param>
      <Statuses>
        <Status id="1" ServerID="AAA">not install</Status>
        <Status id="2" ServerID="BBB">not install</Status>
      </Statuses>
    </Process>
    <Process Id="3" Name="Destination" ServerID="BBB" ServerURL="http://bbb.com/imgprocessor/dest/">
      <Param>Destination</Param>
      <Statuses>
        <Status id="1" ServerID="AAA">not install</Status>
        <Status id="2" ServerID="BBB" ServerURL="http://bbb.com/imgprocessor/dest/">available</Status>
      </Statuses>
    </Process>
  </ImagingProcess>
  <Destination>
    <URI protocol="WebDAV">http://docserver.com/myfolder/</URI>
  </Destination>
  <DocumentProperty>
    <DocumentName>Scanned Document</DocumentName>
  </DocumentProperty>
</ScanProcess>
```

FIG. 8

```xml
<?xml version="1.0" encoding="utf-8"?>
<ScanProcess id="123" Caption="MyProcess" Comment="Save to my folder on server">
    <ScanConfiguration id="1">
        <ColorMode>Full Color</ColorMode>
        <Resolution line="X">300</Resolution>
        <Resolution line="Y">300</Resolution>
        <Duplex>Book</Duplex>
    </ScanConfiguration>
    <ImagingProcess>
        <Process id="1" Name="FileCovert" ServerID="AAA" ServerURL="http://aaa.com/imgprocessor/fileconvert/">
            <Param kind="FileFormat">pdf</Param>
            <Statuses>
                <Status id="1" ServerID="AAA" ServerURL="http://aaa.com/imgprocessor/fileconvert/">available</Status>
                <Status id="2" ServerID="BBB">not install</Status>
            </Statuses>
            <Result>success</Result>
        </Process>
        <Process id="2" Name="OCR" ServerID="BBB" ServerURL="http://bbb.com/imgprocessor/ocr/">
            <Param kind="Language">japanese</Param>
            <Statuses>
                <Status id="1" ServerID="AAA">not install</Status>
                <Status id="2" ServerID="BBB">not install</Status>
            </Statuses>
        </Process>
        <Process id="3" Name="Destination" ServerID="BBB" ServerURL="http://bbb.com/imgprocessor/dest/">
            <Param>Destination</Param>
            <Statuses>
                <Status id="1" ServerID="AAA">not install</Status>
                <Status id="2" ServerID="BBB" ServerURL="http://bbb.com/imgprocessor/dest/">available</Status>
            </Statuses>
        </Process>
    </ImagingProcess>
    <Destination id="1">
        <URI protocol="WebDAV">http://docserver.com/myfolder/</URI>
    </Destination>
    <DocumentProperty>
        <DocumentName>Scanned Document</DocumentName>
    </DocumentProperty>
</ScanProcess>
```

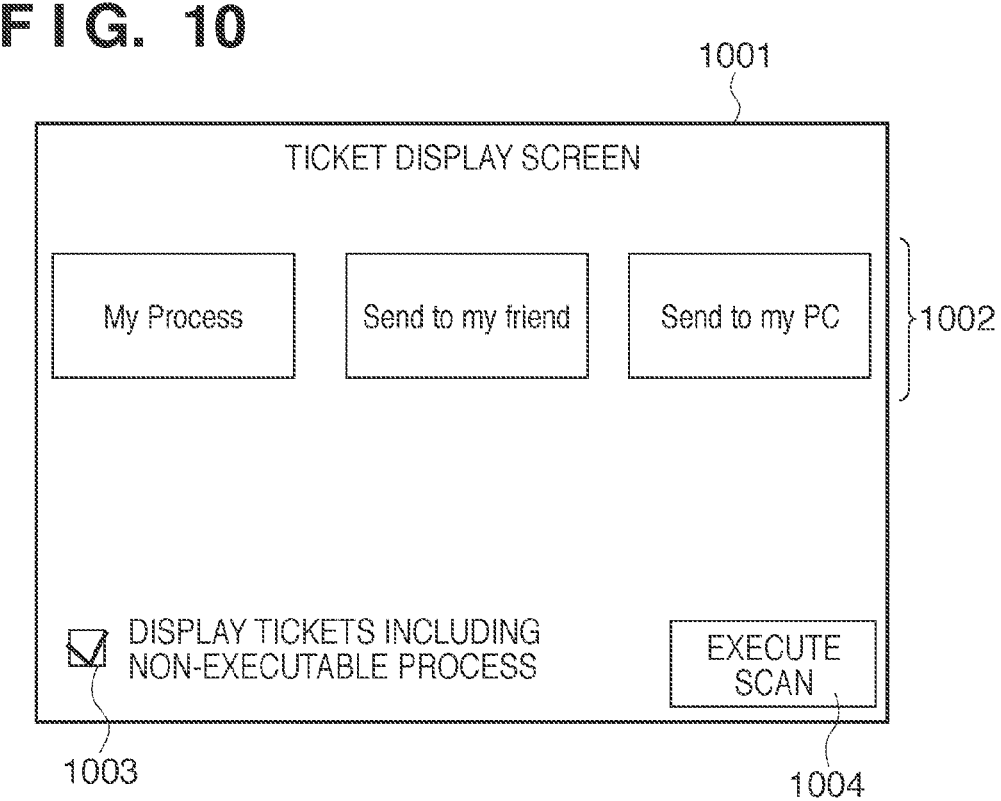

FIG. 11

| | PROCESSING SERVER 60 | ~1101 |
|---|---|---|
| ServerID | AAA | |
| FUNCTION | PDF CONVERSION | |

```
<?xml version="1.0" encoding="utf-8"?>
<ServerFeatureConf
  <ServerInf>
    <ServerName>PROCESSING SERVER 60</ServerName>
    <ServerID>AAA</ServerID>
  </ServerInf>
  <Feature id="1">
    <Name>FileCovert</Name>
    <FriendlyName>PDF CONVERSION</FriendlyName>
    <FeatureURL>http://aaa.com/Imgprocessor/fileconvert/</FeatureURL>
    <ParamList kind="FileFormat">
      <Param id="1">pdf</Param>
    </ParamList>
  </Feature>
</ServerFeatureConf>
```

| | PROCESSING SERVER 70 | ~1102 |
|---|---|---|
| ServerID | BBB | |
| FUNCTION | WEBDAV FILE STORAGE | |

```
<?xml version="1.0" encoding="utf-8"?>
<ServerFeatureConf
  <ServerInf>
    <ServerName>PROCESSING SERVER 70</ServerName>
    <ServerID>BBB</ServerID>
  </ServerInf>
  <Feature id="1">
    <Name>Destination</Name>
    <FriendlyName>WEBDAV FILE STORAGE</FriendlyName>
    <FeatureURL>http://bbb.com/Imgprocessor/dest/</FeatureURL>
    <ParamList kind="protocol">
      <Param id="1">http://docserver.com/myfolder</Param>
    </ParamList>
  </Feature>
</ServerFeatureConf>
```

F I G. 16

| PROCESS SETTING | AAA (PROCESSING SERVER 60) | BBB (PROCESSING SERVER 70) |
|---|---|---|
| FileConvert(pdf) | EXECUTABLE | EXECUTABLE |
| OCR | NON-EXECUTABLE | EXECUTABLE |
| Destination(WebDAV) | NON-EXECUTABLE | EXECUTABLE |
| PROCESSING SCORE | 1 | 3 |

```xml
<?xml version="1.0" encoding="utf-8"?>
<ScanProcess id="123" Caption="MyProcess" Comment="Save to my folder on server">
  <ScanConfiguration id="1">
    <ColorMode>Full Color</ColorMode>
    <Resolution line="X">300</Resolution>
    <Resolution line="Y">300</Resolution>
    <Duplex>Book</Duplex>
  </ScanConfiguration>
  <ImagingProcess>
    <Process id="1" Name="FileCovert" ServerID="AAA" ServerURL="http://aaa.com/imgprocessor/fileconvert/">
      <Param kind="FileFormat">pdf</Param>
      <Statuses>
        <Status id="1" ServerID="AAA" ServerURL="http://aaa.com/imgprocessor/fileconvert/">available</Status>
        <Status id="2" ServerID="BBB" ServerURL="http://bbb.com/imgprocessor/fileconvert/">available</Status>
      </Statuses>
    </Process>
    <Process id="2" Name="OCR" ServerID="BBB" ServerURL="http://bbb.com/imgprocessor/ocr/">
      <Param kind="Language">japanese</Param>
      <Statuses>
        <Status id="1" ServerID="AAA">not install</Status>
        <Status id="2" ServerID="BBB" ServerURL="http://bbb.com/imgprocessor/ocr/">available</Status>
      </Statuses>
    </Process>
    <Process id="3" Name="Destination" ServerID="BBB" ServerURL="http://bbb.com/imgprocessor/dest/">
      <Param>Destination</Param>
      <Statuses>
        <Status id="1" ServerID="AAA">not install</Status>
        <Status id="2" ServerID="BBB" ServerURL="http://bbb.com/imgprocessor/dest/">available</Status>
      </Statuses>
    </Process>
  </ImagingProcess>
  <Destination id="1">
    <URI protocol="WebDAV">http://docserver.com/myfolder/</URI>
  </Destination>
  <DocumentProperty>
    <DocumentName>Scanned Document</DocumentName>
  </DocumentProperty>
</ScanProcess>
```

IMAGE PROCESSING APPARATUS AND CONTROL METHOD THEREOF

BACKGROUND OF THE INVENTION

1. Field of the Invention

The present invention relates to an image processing apparatus and a control method thereof.

2. Description of the Related Art

In recent years, image processing systems are known in which apparatuses, such as a scanner, a facsimile machine, a copy machine, a multifunction peripheral incorporating the functionality of these apparatuses, a personal computer (PC) and an email server, are connected with a network to execute processing cooperatively using the functions of the apparatuses. In such an image processing system, generally, a cooperative processing flow (workflow) in which the procedure of cooperative processing is defined is created in advance according to a business operation procedure. The user can utilize the functions of the system through an efficient combination of the functions by executing the created cooperative processing flow.

In the image processing system, when a change or addition is made to the services (functions) of the apparatuses on the network, it is necessary to change the already created cooperative processing flow. For example, Japanese Patent Laid-Open No. 2004-151893 proposes a technique for, in a situation as described above, allowing the user to create a new workflow with ease based on service information of the apparatuses acquired via the network.

This conventional technique, however, has the following problems. When a change is made to the functions of the apparatuses of the image processing system, for example, the cooperative processing flow needs to be changed manually to conform to the content of the change, which requires the user to perform complicated tasks. In such a situation, if the user executes the cooperative processing flow without changing it, the processing will stop midway, which reduces the processing efficiency of the image processing system.

SUMMARY OF THE INVENTION

The present invention has been conceived in view of the above-described problems, and the present invention provides an image processing apparatus in which when a change is made to the functions of apparatuses that execute a cooperative processing flow, the definition of the cooperative processing flow is changed and executed without requiring the user to perform complicated tasks.

One aspect of the present invention provides an image processing apparatus that executes image processing on image data in cooperation with a plurality of external apparatuses, the image processing apparatus comprising: an acquiring unit that acquires a cooperative processing flow in which a procedure of cooperative processing to be executed on the image data has been defined in advance from an external storage apparatus that manages the cooperative processing flow; a confirmation unit that, with respect to each of a plurality of functions included in the acquired cooperative processing flow, confirms whether or not the function is executable by each of the plurality of external apparatuses; a changing unit that, with respect to each of the plurality of functions, if the function is confirmed to not be executable by the external apparatus predefined to execute the function, changes the definition of the cooperative processing flow such that the function is executed by another external apparatus that has been confirmed to be capable of executing the function; and an execution control unit that causes cooperative processing in accordance with the cooperative processing flow changed by the changing unit to be executed by an external apparatus defined in the cooperative processing flow.

Another aspect of the present invention provides a method for controlling an image processing apparatus that executes image processing on image data in cooperation with a plurality of external apparatuses, the method comprising: acquiring, with an acquiring unit, a cooperative processing flow in which a procedure of cooperative processing to be executed on the image data has been defined in advance from an external storage apparatus that manages the cooperative processing flow; confirming, with a confirmation unit, with respect to each of a plurality of functions included in the acquired cooperative processing flow, whether or not the function is executable by each of the plurality of external apparatuses; changing, with a changing unit, with respect to each of the plurality of functions, if the function is confirmed to not be executable by the external apparatus predefined to execute the function, the definition of the cooperative processing flow such that the function is executed by another external apparatus that has been confirmed to be capable of executing the function; and causing, with an execution control unit, cooperative processing in accordance with the cooperative processing flow changed in the changing step to be executed by an external apparatus defined in the cooperative processing flow.

According to the present invention, it is possible to provide an image processing apparatus in which when a change is made to the functions of apparatuses that execute a cooperative processing flow, the definition of the cooperative processing flow is changed and executed without requiring the user to perform complicated tasks.

Further features of the present invention will become apparent from the following description of exemplary embodiments with reference to the attached drawings.

BRIEF DESCRIPTION OF THE DRAWINGS

FIG. 1 is a diagram showing an example of a configuration of an image processing system 1000 according to Embodiment 1.

FIG. 2 is a diagram showing an example of a hardware configuration of a scanner 10 of the image processing system 1000 according to Embodiment 1.

FIG. 3 is a diagram showing an example of a hardware configuration of servers 20, 40, 60 and 70 of the image processing system 1000 according to Embodiment 1.

FIG. 4 is a diagram showing an example of a hardware configuration of a ticket generation client 30 of the image processing system 1000 according to Embodiment 1.

FIG. 5 is a diagram showing an example of a ticket according to Embodiment 1.

FIG. 6 is a diagram showing an example of a ticket according to Embodiment 1.

FIG. 7 is a diagram showing an example of a ticket according to Embodiment 1.

FIG. 8 is a diagram showing an example of a ticket according to Embodiment 1.

FIG. 9 is a diagram showing an example of a ticket list according to Embodiment 1.

FIG. 10 is a diagram showing an example of a display screen displayed on an operation unit 105 of the scanner 10 according to Embodiment 1.

FIG. 11 shows examples of function management tables of processing servers according to Embodiment 1.

FIG. 16 is a diagram showing an example of a function state table and a ticket according to Embodiment 2.

DESCRIPTION OF THE EMBODIMENTS

Figure 12:
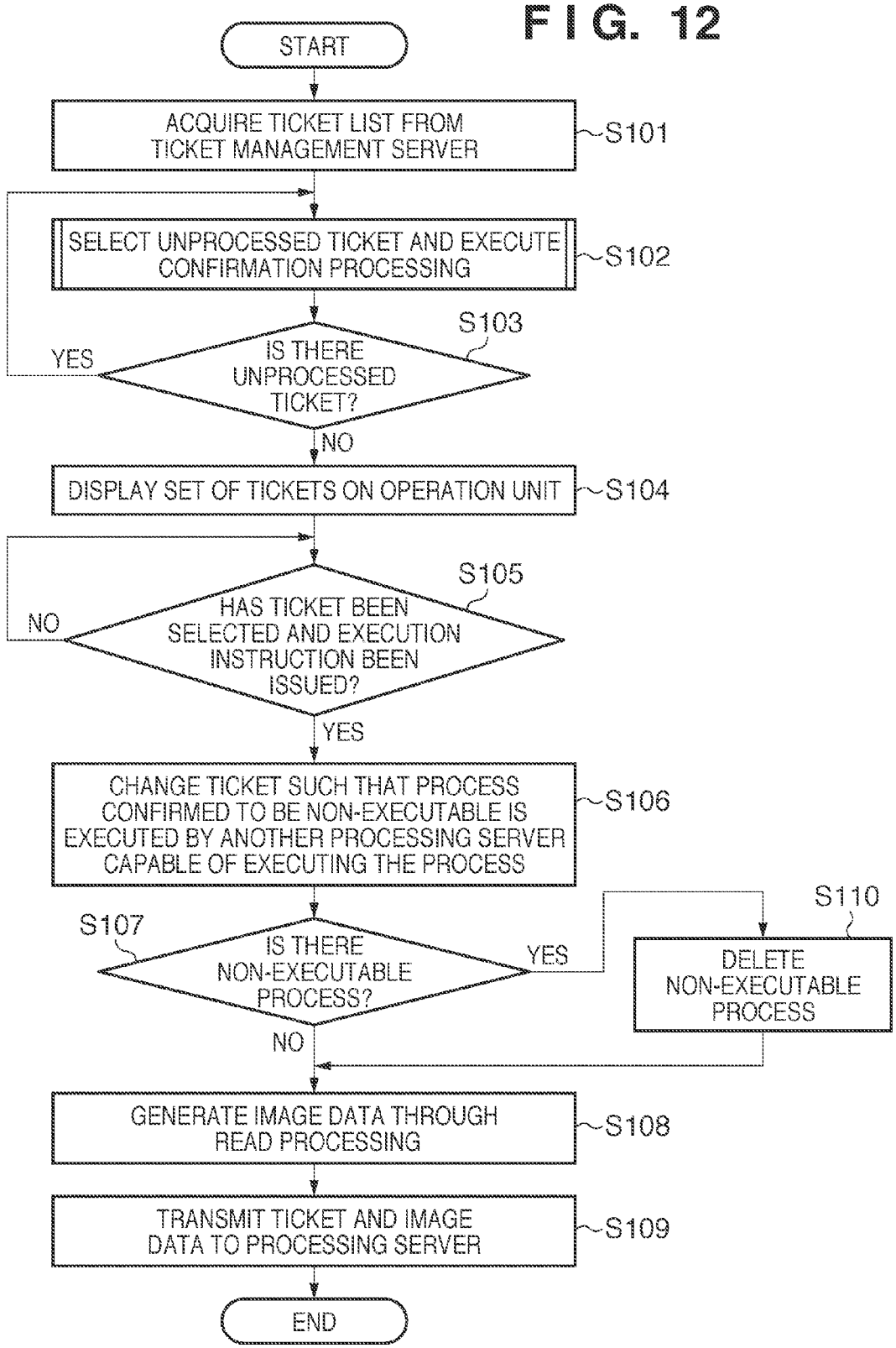
FIG. 12 is a flowchart illustrating a procedure of ticket execution processing performed by the scanner 10 according to Embodiment 1.

Hereinafter, embodiments of the present invention will be described. The individual embodiments described below will be useful in understanding various concepts of the present invention such as superordinate concepts, intermediate concepts, and subordinate concepts. It should be understood that the technical scope of the present invention is defined by the appended claims, and is not limited by the individual embodiments given below.

Embodiment 1

Configuration of Image Processing System 1000

Embodiment 1 according to the present invention will be described below with reference to FIGS. 1 to 14. An example of a configuration of an image processing system 1000 will be described first with reference to FIG. 1. The image processing system 1000 includes an image processing apparatus (scanner) 10, a ticket management server 20, a ticket generation client 30, a document management server 40, and processing servers 60 and 70, and these elements are connected via a network (LAN) 50. The scanner 10 can be any apparatus as long as it has a scanner function of reading images from an original, and it can be, for example, a multiple function peripheral (MFP). The ticket management server 20 can be any apparatus as long as it has a function of storing data, and it can be a storage apparatus or other apparatus such as an apparatus capable of providing directory services such as active directory. The number of processing servers does not necessarily have to be two (the processing servers 60 and 70) as shown in FIG. 1, and any number of processing servers may be provided on the LAN 50.

In the image processing system 1000, the scanner 10 executes image processing on image data in cooperation with a plurality of external apparatuses (the processing servers 60 and 70) that are connected via the LAN 50. Specifically, the image processing is executed in accordance with a cooperative processing flow (hereinafter referred to as a "ticket") in which a procedure of cooperative processing for cooperatively executing the functions of the external apparatuses has been defined in advance. The ticket is generated by the ticket generation client 30 and stored in the ticket management server 20.

As will be described later, the ticket includes definitions regarding the functions of the external apparatuses that cooperatively work with the scanner 10 and the content of the processing. The ticket includes, for example, settings regarding processes performed on image data generated by the scanner 10, such as file format conversion (for example, conversion to PDF format), e-mail transmission, file transmission and OCR processing. The ticket may also include settings regarding a reading condition for the scanner 10 to read an image from an original, such as resolution and size.

Configuration of Scanner 10

An example of a hardware configuration of the scanner 10 will be described next with reference to FIG. 2. In FIG. 2, in particular, an example of a configuration of a controller unit 118 will be described. In the controller unit 118, the following devices are disposed on a system bus 106. A CPU 101 is a processor that performs overall control of the scanner 10. An NVMEM 100 is a non-volatile memory, which stores setting information and the like. The NVMEM 100 functions as, for example, a system work memory for the CPU 101 to perform operations, a program memory for storing programs, and an image memory for temporarily storing image data. A flash ROM 102 is a rewritable non-volatile memory, which stores various control programs for controlling the system. A USB port 110 enables connection to a USB device 111.

An operation unit I/F 104 is an interface unit with an operation unit 105. The operation unit I/F 104 outputs, to the operation unit 105, image data such as an operation screen to be displayed on the operation unit 105, and sends information input from the operation unit 105 to the CPU 101. The operation unit 105 includes an LCD display unit that displays a system operation screen, operation keys, and a touch panel sheet attached onto the LCD display unit. The operation unit 105 sends input information when the user has pressed an operation key and position information when the user has pressed the touch panel sheet to the CPU 101 via the operation unit I/F 104.

A LAN I/F 107 is an interface for connecting to a LAN. The scanner 10 transmits data to other apparatuses (a PC and servers) provided on the LAN 50 via the LAN I/F 107, or acquires data from other apparatuses via the LAN I/F 107. An image bus I/F 108 is a bus bridge that connects the system bus 106 and an image bus 112 and converts data structures. The image bus 112 can be a PCI bus or IEEE 1394, and is capable of transferring image data at high speed. The following devices are disposed on the image bus 112.

A raster image processor (RIP) 113 expands vector data such as PDL code to a bit map image. A scanner I/F 115 is an interface unit that connects a scanner unit 117 that functions as an image reading unit and the controller unit 118, and converts image data. The scanner unit 117 reads images from an original and thereby generates image data. The reading method can be, for example, a method using a laser. The controller unit 118 inputs and outputs image data, device information and the like to and from the scanner unit 117 via the scanner I/F 115.

An image processing unit 116 executes image processing such as correction, manipulation or editing, on input image data. For example, the image processing unit 116 performs correction, resolution conversion or the like on image data generated by the scanner unit 117. The image processing unit 116 is also capable of performing rotation processing on input image data, as well as performing JPEG compression/decompression processing on multi-valued image data, and JBIG, MMR or MH compression/decompression processing on binary image data.

Configuration of Servers 20, 40, 60 and 70

An example of a hardware configuration of the ticket management server 20 will be described next with reference to FIG. 3. The document management server 40 and the processing servers 60 and 70 have the same configuration as well. In the ticket management server 20, a CPU 21 controls a RAM 22, a storage device 23 and a network device 24 via a main bus 25. The RAM 22 provides a work area for the CPU 21. The storage device 23 stores various programs and settings. The network device 24 performs communication with other apparatuses that are connected via the LAN 50.

Configuration of Ticket Generation Client 30

An example of a hardware configuration of the ticket generation client 30 will be described next with reference to FIG. 4. In the ticket generation client 30, a CPU 31 controls a RAM 32, a storage device 33, a user input device 34, a UI display device 35 and a network device 36 via a main bus 37. The RAM 32 provides a work area for the CPU 31. The storage device 33 can be, for example, a hard disk or an NVRAM, and stores various programs and settings. The user input device 34 is an input device for the user to input commands. The UI display device 35 is an device that displays a screen. The network device 36 performs communication with other apparatuses that are connected via the LAN 50.

The ticket generated by the ticket generation client 30 will be described now with reference to FIG. 5. The present embodiment will be described using, as an example, an XML format file as a ticket, but any file format can be used as long as structured data can be expressed. A ticket 501 is generated by the ticket generation client 30, and is stored and managed by the ticket management server 20. The ticket management server 20 manages a large number of tickets of the same type as the ticket shown in FIG. 5, and provides any one of the tickets to the scanner 10 in response to a request.

In a scan setting 502 (<Scan Configuration> element), setting information indicating a reading condition for the scanner 10 to read an image from an original is defined. The setting information includes settings necessary for reading such as, for example, color mode, resolution and duplex, and it may include other settings.

In a flow setting 503 (<Imaging Process> element), the content of image processing that is executed by a plurality of external apparatuses (the processing servers 60 and 70) on image data generated by the scanner 10 and the execution order of the image processing are defined. Specifically, in the flow setting 503, a setting (process setting) regarding a function that is used in the image processing is defined. Here, a plurality of process settings may be defined, and each process setting includes the content of a function/process to be executed, the order in which the function is executed, and a setting regarding an external apparatus that executes the function.

In FIG. 5, as the flow setting 503, process settings 504, 505 and 506 (<Process> elements) have been defined. In each of the process settings 504, 505 and 506, the order of execution (id), the process name (Name), the ID (Server ID) and URL (Server URL) of a processing server, and setting information (<Param> element) that is necessary for the process are defined.

In a storage destination 507 (<Destination> element), the address, folder path and communication protocols of a server that is to store image data processed in accordance with the flow setting 503 are written. In a document attribute 508 (<Document Property> element), attribute information regarding image data to be stored is defined, and for example, information regarding document name, update date/time and creator is included.

Ticket Execution Processing by Scanner 10

A procedure of ticket execution processing performed by the scanner 10 according to the present embodiment will be described next with reference to FIG. 12. Firstly, in S101, the CPU 101 of the scanner 10 makes a request for a ticket list by communication with the external ticket management server 20, and acquires the list. After that, the procedure advances to S102. At this time, the CPU 101 acquires a ticket list 901 as shown in FIG. 9 from the ticket management server 20, and stores the list in the NVMEM 100. The CPU 101 makes, based on the result of log-in authentication of a user who is using the scanner 10, a request for a ticket list that is associated with the user. In this case, the CPU 101 transmits user identification information or authentication information to the ticket management server 20.

In S102 and S103, the CPU 101 executes, on each ticket, processing for confirming whether or not a plurality of functions (processes) included in the definition are executable by each processing server. In S102, the CPU 101 first selects a ticket that has not undergone confirmation processing from the ticket list 901, and executes confirmation processing. Specifically, the CPU 101 transmits the selected ticket to the processing server that has been defined in advance in the ticket. This causes the processing server to which the selected ticket has been transmitted to confirm whether or not it can execute each process defined in the ticket to be confirmed. The processing server that has received the ticket executes confirmation processing on each of all processes defined in the ticket, and appends the result to the ticket.

The processing performed in S102 can be implemented as a result of the scanner 10 transmitting a ticket to be confirmed to any one of the processing servers defined in the ticket and the ticket being transferred between defined servers. For example, if the ticket 501 of FIG. 5 is a ticket to be confirmed, the scanner 10 transmits the ticket to the processing server 60 that is to execute the process setting 504 defined first in the ticket. The processing server 60 executes confirmation processing, and thereafter transfers the ticket to another processing server 70 defined in the ticket 501. After execution of confirmation processing in all of the processing servers defined in the ticket 501, the ticket is returned to the scanner 10. After that, the procedure advances to S103. The processing performed in S102 can also be implemented by the scanner 10 individually transmitting and receiving the ticket to and from each processing server.

A ticket 701 shown in FIG. 7 is an example of the ticket 501 to be confirmed eventually returned to the scanner 10 after confirmation processing in respective processing servers. In the ticket 501, the processing server 60 (ServerID="AAA") and the processing server 70 (ServerID="BBB") have been defined as processing servers that execute the processes included in the ticket. In the returned ticket 701, on the other hand, information 712 and 713 indicating whether or not the function is executable by each of the processing servers 60 and 70 have been appended to process settings 702 and 703. In each of the information 712 and 713, "not install" indicates that the function cannot be executed by the processing server designated by the server ID. Ticket confirmation processing performed by each processing server will be described later with reference to FIG. 13.

Next, in S103, the CPU 101 determines whether or not confirmation processing has been performed on all of the tickets included in the ticket list 901. If it is determined in this step that there is a ticket that has not yet undergone confirmation processing, the procedure returns to S102, and the confirmation processing is continued. If, on the other hand, it is determined that confirmation processing has been performed on all of the tickets, the procedure advances to S104.

In S104, the CPU 101 displays a set of tickets on the LCD display unit of the operation unit 105 based on the ticket list 901. For example, a display screen 1001 as shown in FIG. 10 is displayed on the operation unit 105. In the display screen 1001, a set 1002 of tickets, a display switch button 1003 and an execution instruction button 1004 are displayed as soft keys. After that, the procedure advances to S105.

In S105, the CPU 101 determines whether or not a ticket has been selected and an instruction to execute the ticket has been issued by the user. This determination processing can be implemented by detecting, for example, whether or not the execution instruction button 1004 on the display screen 1001 has been pressed. If it is determined in this step that the execution instruction has not been issued, the CPU 101 repeats the processing of S105. If, on the other hand, it is determined that the execution instruction has been issued, the procedure advances to S106, and ticket execution processing is started.

In S106, with respect to one of a plurality of processes defined in the ticket to be executed that has been confirmed to not be executable by the processing server predefined to execute it, the CPU 101, if possible, changes the processing server that is to execute the process. More specifically, if it has been determined that the process confirmed as non-executable can be executed by another processing server, the CPU 101 changes the definition of the ticket such that the process is to be executed by the other processing server. After that, the procedure advances to S107.

In S107, the CPU 101 determines whether or not there is a process (non-executable process) that has been confirmed to not be executable not only by the preset processing server but also by all other processing servers in the ticket to be executed. If it is determined in this step that there is no non-executable process, the procedure advances to S108. If, on the other hand, it is determined in S107 that there is a non-executable process, the procedure advances to S110. In S110, the CPU 101 deletes the settings regarding the non-executable process from the ticket to be executed, and the procedure advances to S108. For example, in the case of the ticket 701, the information 713 included in the process setting 703 is deleted.

In S108, the CPU 101 reads an image from an original in accordance with the reading condition (for example, a scan setting 705 of FIG. 7) included in the ticket that has undergone the above processing, and thereby generates image data. At this time, the image data is generated in a file format (for example, JPEG, TIFF, PDF or the like) that can be expanded by an external processing server. After that, in S109, the CPU 101 transmits the ticket and the image data to the processing server that executes the first process to be executed among the plurality of processes included in the ticket. The processing performed in S109 corresponds to processing performed by an execution control unit. In the case of the ticket 701, the CPU 101 transmits the data to the processing server 60 that executes the process setting 702. The CPU 101 thereby causes the first processing server 60 to start the processing of the process setting 702, and at the same time causes each processing server to execute cooperative processing in accordance with the definition of the ticket.

In FIG. 10, if the display switch button 1003 is unchecked, the CPU 101 may perform control such that tickets including a non-executable process are not displayed on the display screen 1001. This disables the selection of a ticket including a non-executable process in the display screen 1001, and it is therefore possible to prohibit execution of the non-executable process.

Ticket Confirmation Processing by Each Processing Server

A procedure for executing confirmation processing (the processing of S102 of FIG. 12) performed by each processing server according to the present embodiment will be described next with reference to FIG. 13, taking processing performed by the processing server 60 as an example. Firstly, in S201, the CPU 21 of the processing server 60 receives a ticket to be confirmed that has been transmitted from the scanner 10 or transferred from another processing server. Here, it is assumed that the processing server 60 has received the ticket 501 from the scanner 10. After that, the procedure advances to S202.

In S202, the CPU 21 extracts an unconfirmed process setting from the received ticket. Then, in S203, the CPU 21 determines whether or not execution of the function (process) defined in the process setting is possible. This determination processing is executed by, for example, the processing servers referring to function management tables 1101 and 1102 as shown in FIG. 11 that are stored in the storage device 33, the RAM 32 or the like. If the function to be confirmed is present in the corresponding one of the function management tables 1101 and 1102, the CPU 21 determines that execution of the function is possible. If it is determined in this step that execution of the function is possible, then in S204, the CPU 21 appends information indicating that execution is possible to the process setting to be confirmed. If, on the other hand, it is determined that execution of the function is not possible, then in S205, the CPU 21 appends information indicating that execution is not possible to the process setting. After execution of either processing in S204 or S205, the procedure advances to S206.

In S206, the CPU 21 determines whether or not there is a process setting that has not yet undergone confirmation processing in the ticket to be confirmed. If it is determined in this step that there is an unconfirmed processing setting, the procedure returns to S202, and the confirmation processing is continued. If, on the other hand, it is determined that there is no unconfirmed process setting, the procedure advances to S207.

In S207, the CPU 21 determines whether or not there is a processing server that has not yet executed the above confirmation processing among the processing servers defined in the ticket to be confirmed. This determination processing can be implemented by, for example, extracting the URLs and the server IDs predefined in the ticket and comparing them with the URLs and the server IDs included in the information that has been appended to each process setting. If it is determined in this step that there is a processing server that has not executed the confirmation processing, the procedure advances to S208. If, on the other hand, it is determined that there is no processing server that has not executed the confirmation processing, the procedure advances to S209.

A ticket 601 shown in FIG. 6 is an example of a ticket obtained after the processing server 60 has executed the processing from S202 to S206 on the ticket 501 to be confirmed. In the ticket 601, information 612, 613 and 614 indicating whether or not the respective function is executable by the server 60 (ServerID="AAA") have been appended respectively to predefined process settings 602, 603 and 604. In the ticket 601, in addition to the server 60, the server 70 (ServerID="BBB") has been defined as a processing server that executes defined functions.

In S208, the CPU 21 transfers the ticket to one of the processing servers defined in the ticket that has not executed the confirmation processing. In the case of the ticket 601, for example, the CPU 21 transfers the ticket to the processing server 70 (ServerID="BBB") that has not executed the confirmation processing. In S209, the CPU 21 returns the ticket on which execution of the confirmation processing has been completed to the scanner 10. Alternatively, the ticket may be returned to the scanner 10 by relaying the ticket via the processing servers defined in the ticket by repeatedly returning the ticket to the transmission source processing server. After either processing in S208 or S209, the procedure ends.

Ticket Execution Processing by Each Processing Server

Figure 13:
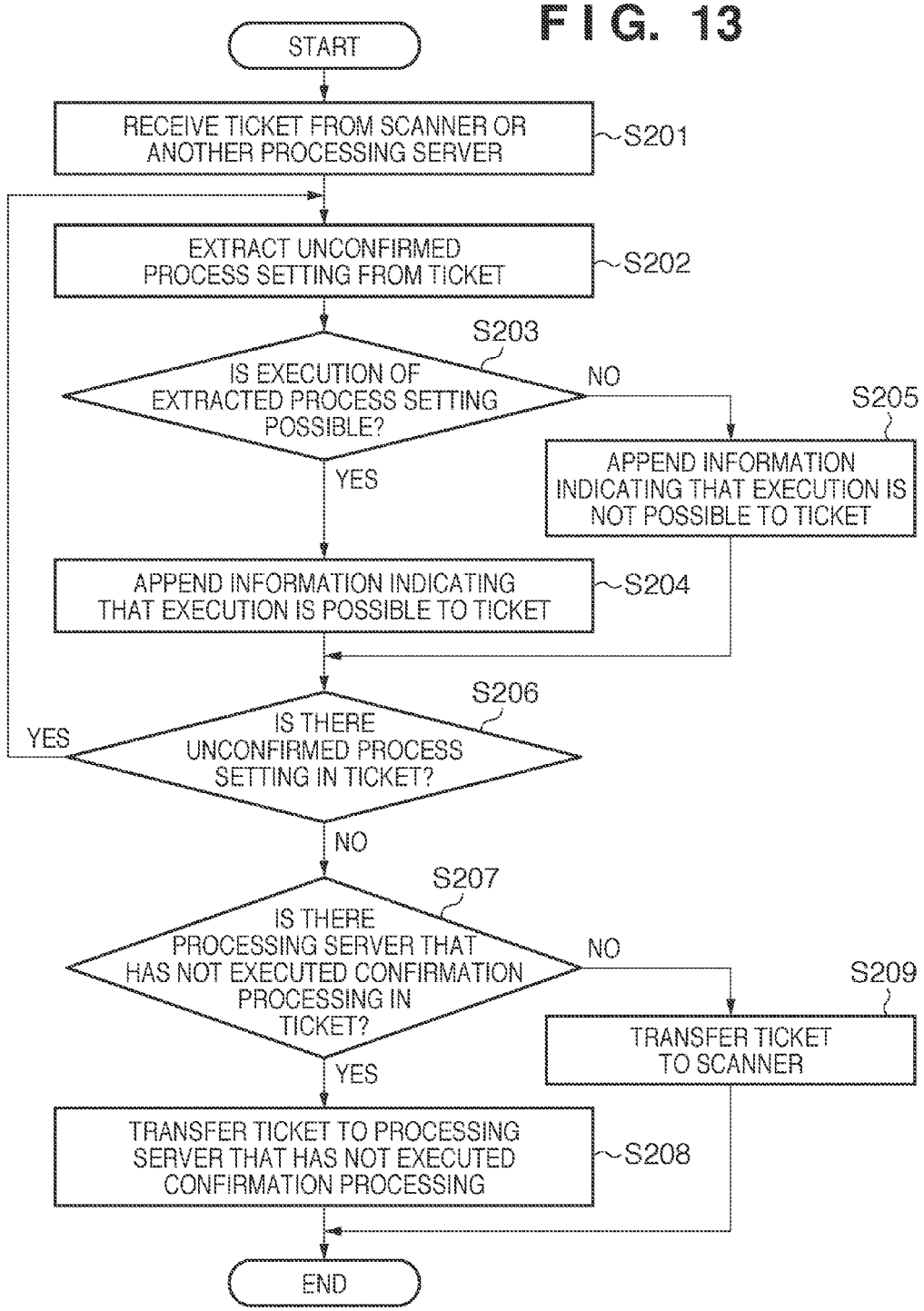
FIG. 13 is a flowchart illustrating a procedure of ticket confirmation processing performed by each processing server according to Embodiment 1.
Figure 14:
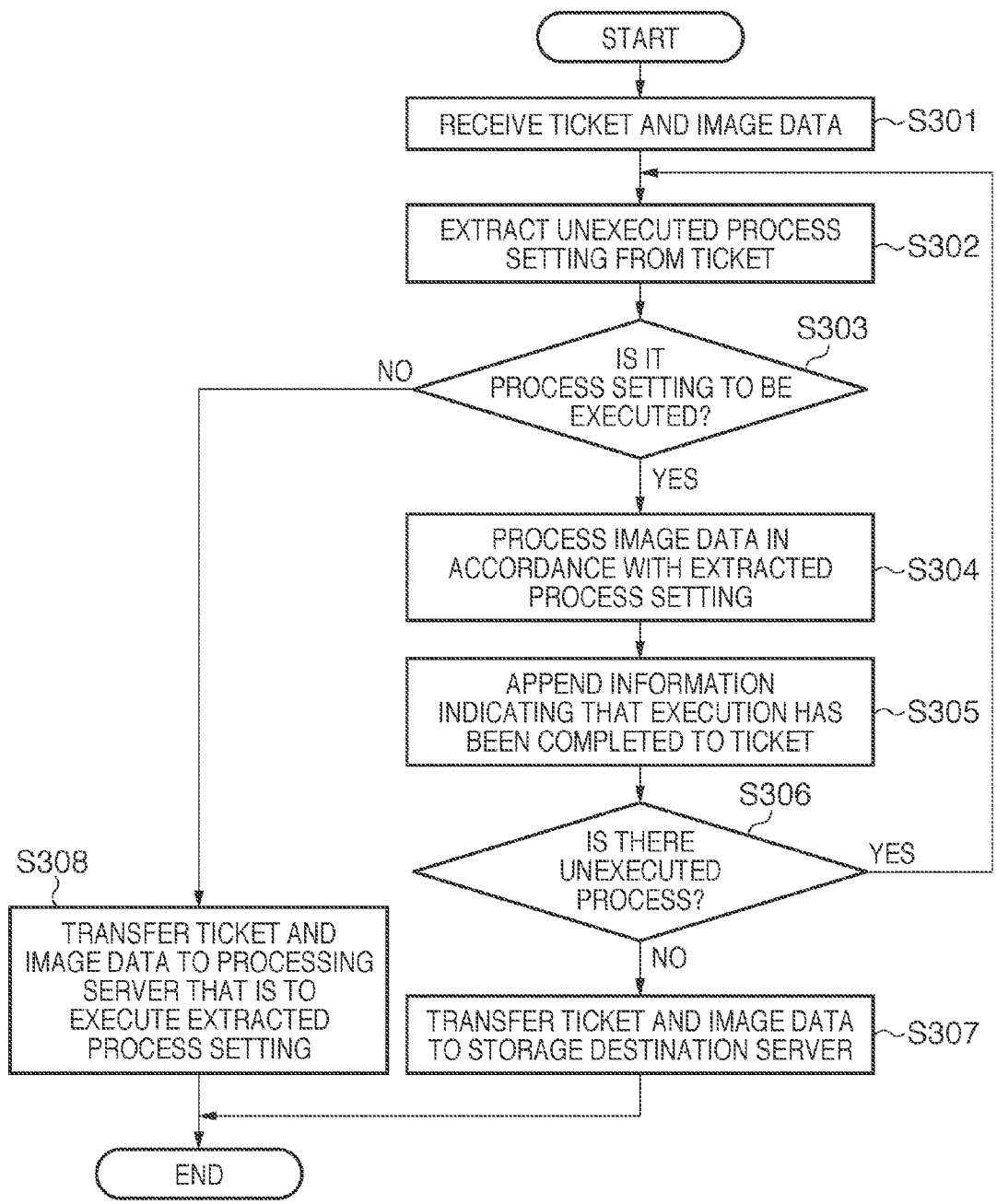
FIG. 14 is a flowchart illustrating a procedure of ticket execution processing performed by each processing server according to Embodiment 1.

When a ticket and image data have been transmitted from the scanner 10 in S109 of FIG. 12, image processing is executed on the image data by a plurality of processing servers in accordance with the definition of the ticket. Hereinafter, a procedure of ticket execution processing performed by each processing server according to the present embodiment will be described with reference to FIG. 14.

Firstly, in S301, the CPU 21 of the processing server receives a ticket to be executed and image data to be image-processed in accordance with the ticket that have been transmitted from the scanner 10 or transferred from another processing server. Upon receiving the data, in S302, the CPU 21 confirms the process settings of the received ticket in the predefined order of execution, and extracts an unexecuted process setting. After that, the procedure advances to S303.

In S303, the CPU 21 determines whether or not the extracted process setting is to be executed. This determination is made based on the server ID and URL included in the extracted process setting. If it is determined in this step that the process setting is not to be executed, the procedure advances to S308. In S308, the CPU 21 transfers the ticket and the image data to the process server defined to execute the function of the process setting, and the procedure ends. If, on the other hand, it is determined in S303 that the process setting is to be executed, the CPU 21 advances to S304.

In S304, the CPU 21 performs image processing on the image data by executing the defined function in accordance with the extracted process setting. Furthermore, in S305, the CPU 21 appends information indicating that execution of the process setting has been completed to a portion corresponding to the extracted process setting in the ticket. In the present embodiment, a setting 802 (<Result> element) in a ticket 801 shown in FIG. 8 corresponds to this information. After this processing, the procedure advances to S306.

In S306, the CPU 21 determines whether or not there is an unexecuted process in the ticket. If it is determined in this step that there is an unexecuted process, the procedure returns to S302, and the above-described processing is repeated. If, on the other hand, it is determined that there is no unexecuted process, the ticket and the image data are transferred to the storage destination server defined in the ticket, and the procedure ends.

As described above, the image processing apparatus according to Embodiment 1 acquires, in order to execute image processing on image data in cooperation with a plurality of external apparatuses, a cooperative processing flow, in which a procedure of the cooperative processing has been defined in advance, from an external storage apparatus. Before execution of processing in accordance with the acquired cooperative processing flow, the image processing apparatus confirms whether or not a plurality of functions included in the flow are executable by each of a plurality of external apparatuses predefined in the flow. Furthermore, with respect to a function that has been confirmed to not be executable by the external apparatus predefined to execute the function, the image processing apparatus changes the definition of the flow such that the function is executed by another external apparatus that has been confirmed to be capable of executing the function, and thereafter starts execution of processing in accordance with the flow. It is thereby possible to, when a change is made to the functions of the external apparatuses that execute a cooperative processing flow, change the definition of the flow and execute the flow without requiring the user to perform complicated tasks. It is also possible to suppress interruptions in the processing in accordance with the cooperative processing flow due to errors. As a result, the image processing apparatus can, together with a plurality of external apparatuses, prevent reduction of the efficiency of the processing in accordance with the cooperative processing flow.

With respect to each function included in the cooperative processing flow, if the function has been confirmed to not be executable not only by the external apparatus predefined to execute the function, but also by all other external apparatuses, the image processing apparatus of the present embodiment may delete the function from the flow. In this case, the image processing apparatus starts execution of processing in accordance with the definition of the flow that has been changed by deletion of the function. Alternatively, rather than deleting the function, it is also possible to prohibit the execution of processing in accordance with the flow. By doing so, even if a change is made to the functions of the external apparatuses that execute the cooperative processing flow, and as a result a function that cannot be executed by any external apparatus is included in the definition, it is possible to prevent processing in accordance with the flow from being interrupted during execution of the processing, thus preventing the reduction of the processing efficiency.

Embodiment 2

Embodiment 2 of the present invention will be described next with reference to FIGS. 15 and 16. In Embodiment 1, before execution of processing in accordance with a cooperative processing flow, confirmation is made as to whether or not each function included in the definition of the flow is executable, and then the definition of the flow is changed based on the result of the confirmation. In this case, when the functions included in the cooperative processing flow are executed by respective external apparatuses in the defined order, there is a possibility that the ticket and image data might be transferred many times between the external apparatuses depending on the result of the change. To address this, in the present embodiment, when the image processing apparatus changes a cooperative processing flow, the flow is changed such that the external apparatus that has the largest number of executable functions in the flow preferentially executes the functions.

A procedure of ticket execution processing by a scanner 10 according to the present embodiment is basically the same as that of FIG. 12 of Embodiment 1, and thus only differences will be described here. In the present embodiment, a procedure of ticket confirmation processing and a procedure of ticket execution processing by each processing server are the same as those of FIGS. 13 and 14 of Embodiment 1, and thus descriptions thereof are omitted here.

In S106 of FIG. 12, the CPU 101 executes the following processing. In S106, in addition to the same processing as that of Embodiment 1, if a process that has been confirmed to not be executable by the processing server predefined to execute the process can be executed by other processing servers, the CPU 101 changes the flow such that the processing server that has the largest number of executable processes in the ticket preferentially executes the process. In S106, even if the process is executable by the processing server predefined to execute the process as defined, when the priority processing server can execute the process, the CPU 101 can change the flow in the same manner as described above. The processing of S106 will be described below in further detail with reference to FIG. 15.

In S501, the CPU 101 extracts all of the process settings included in the ticket to be processed. Next, in S502, the CPU 101 creates a function state table 1601 as shown in FIG. 16 as an example based on the extracted information. The function state table 1601 is a table created based on a ticket 1611 to be processed. The CPU 101 creates the function state table 1601 by confirming, with respect to each processing server defined in the ticket, whether or not execution of each process is possible. In the ticket 1611, ServerID="AAA" representing the processing server 60 and ServerID="BBB" representing the processing server 70 are written. Accordingly, the CPU 101 confirms whether or not execution is possible by the processing servers 60 and 70 for each of process settings 1612, 1613 and 1614. In the case of the process setting 1612, for example, "available" is written in the status (<Status> element) of each server, and therefore information indicating that the process setting 1612 can be executed by both the processing servers 60 and 70 is set in the function state table 1601.

After that, in S503, the CPU 101 calculates, in the created function state table 1601, the number (processing score) of processes that can be executed by each processing server. Then, in S504, the CPU 101 determines, based on the calculated processing scores, the processing server having the highest processing score as the highest priority processing server. After that, the procedure advances to S505. In the function state table 1601, the processing scores of the processing servers 60 and 70 are calculated to be 1 and 3, respectively. Accordingly, the processing server 70 is determined as the highest priority processing server.

In S505, the CPU 101 selects an unselected process setting from the ticket 1611 in the order of process ID (id) included in each process setting. Then, in S506, the CPU 101 determines whether or not the process is executable by the highest priority processing server. If it is determined in this step that the process is executable by the highest priority processing server, the procedure advances to S507, where the process setting is changed such that the process is executed by the highest priority processing server. After that, the procedure advances to S508. If, on the other hand, it is determined in S506 that the process is not executable by the highest priority processing server, the CPU 101 does not change the process setting, and the procedure advances to S508.

For example, the process setting 1612 of the ticket 1611 is executable by the highest priority processing server 70, and thus the CPU 101 sets the ID and URL (1622) of the processing server 70 as the ID and URL (1621) of the processing server that executes the process so as to cause the processing server 70 to execute the process.

In S508, the CPU 101 determines whether or not there is an unselected process in the ticket 1611. If it is determined in this step that there is an unselected process, the procedure returns to S505, and the setting change processing is continued. If, on the other hand, it is determined that there is no unselected process, the setting change processing ends.

As described above, the image processing apparatus according to Embodiment 2 changes a cooperative processing flow based on the results obtained by confirming whether or not each function is executable with respect to each external apparatus included in the definition of the flow, before execution of processing in accordance with the cooperative processing flow. At this time, the flow is changed such that the external apparatus that has the largest number of executable functions among a plurality of functions in the flow preferentially executes functions. Thus, with the image processing apparatus of the present embodiment, it is possible to reduce the number of processing servers that execute functions included in the cooperative processing flow to the smallest number possible. As a result, in addition to the effects of Embodiment 1, the number of transfers of the ticket and image data between processing servers during execution of processing in accordance with the cooperative processing flow can be reduced, and the effect of reducing the amount of traffic of transmission and reception in the network can be obtained.

Figure 15:
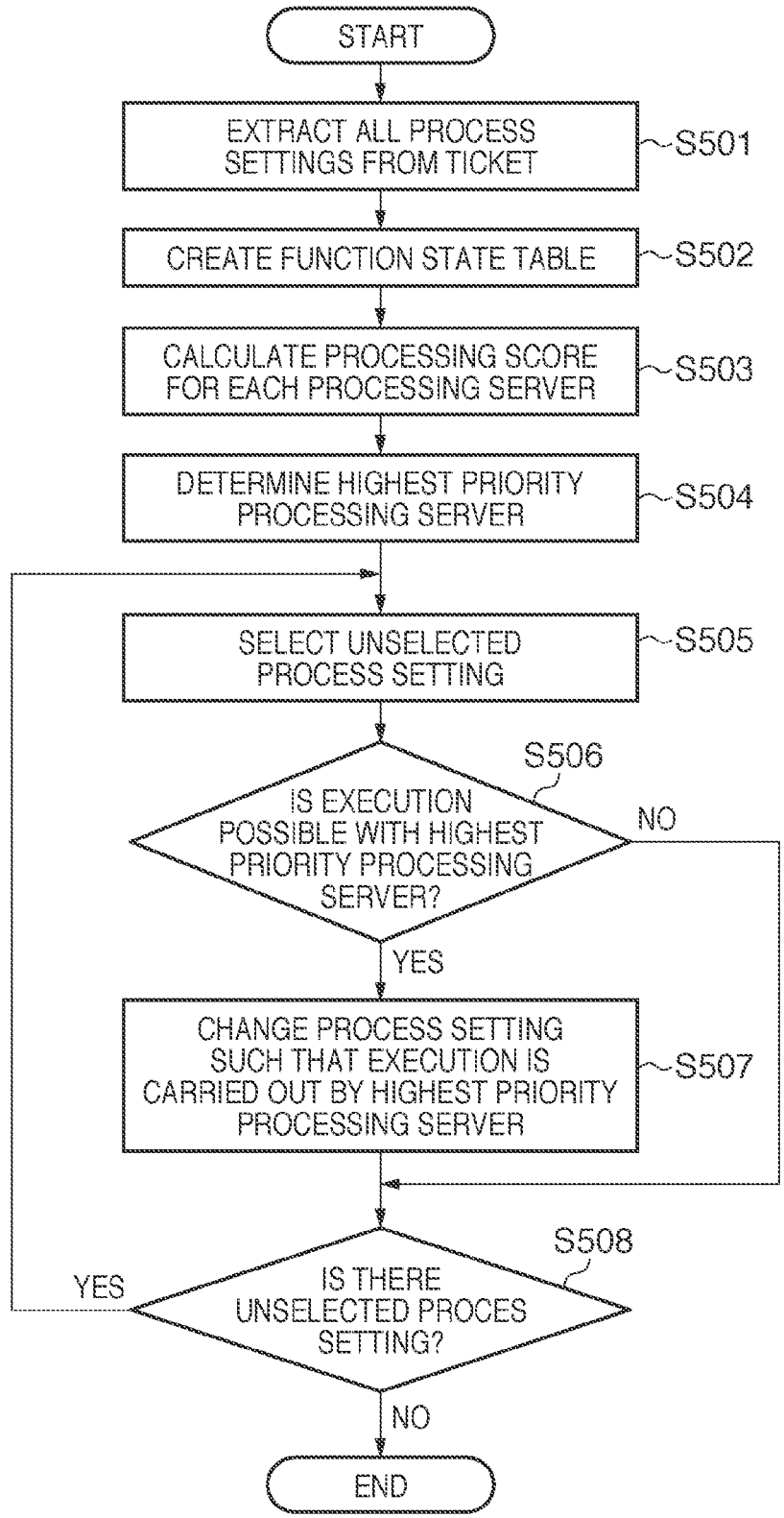
FIG. 15 is a flowchart illustrating a procedure of ticket change processing performed by a scanner 10 according to Embodiment 2.

In the present embodiment, the processing of FIG. 15 has been described in the context of the processing being executed by the scanner 10, but the processing may be executed by any other processing server. Specifically, in S209 of FIG. 13, in the case where the ticket is returned to the scanner 10 by sequentially relaying the ticket from one processing server to the transmission source apparatus, the processing may be executed by the last processing server that relays the ticket to the scanner 10. In this case as well, the same effects as those described above can be obtained.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-263344, filed on Nov. 18, 2009, which is hereby incorporated by reference herein in its entirety.

What is claimed is:

1. An image processing apparatus that is capable of executing image processing on image data in cooperation with a plurality of external apparatuses, the image processing apparatus comprising:
    an acquiring unit that acquires a cooperative processing flow in which contents of a plurality of processes to be executed on the image data and an external apparatus which executes each of the plurality of processes have been defined in advance from an external storage apparatus that manages the cooperative processing flow;
    a confirmation unit that, with respect to each of the plurality of processes included in the acquired cooperative processing flow, confirms whether or not the process is executable by each of a plurality of external apparatuses defined in the cooperative processing flow;
    a changing unit that, with respect to each of the plurality of processes, if the process is confirmed to not be executable by an external apparatus predefined in the cooperative processing flow to execute the process, changes the definition of the cooperative processing flow such that the process is to be executed by another external apparatus that has not been predefined in the cooperative processing flow to execute the process and has been confirmed to be capable of executing the process; and
    an execution control unit that causes cooperative processing to be executed in accordance with the definition of the cooperative processing flow changed by the changing unit.

2. The image processing apparatus according to claim 1, wherein the changing unit comprises a deleting unit that, with respect to each of the plurality of processes, if the process is confirmed to not be executable not only by the external apparatus predefined to execute the process, but also by all other external apparatuses, deletes the non-executable process from the cooperative flow.

3. The image processing apparatus according to claim 1, wherein the changing unit comprises a prohibition unit that, with respect to each of the plurality of processes, if the process is confirmed to not be executable not only by the external apparatus predefined to execute the process, but also by all other external apparatuses, prohibits execution of the cooperative processing flow.

4. The image processing apparatus according to claim 1, wherein the execution control unit transmits the image data and the cooperative processing flow changed by the changing unit to the external apparatus that is predefined to execute a first process to be executed among the plurality of processes, and thereby causes the external apparatus to start processing in accordance with the definition of the cooperative processing flow.

5. The image processing apparatus according to claim 1, wherein the changing unit, with respect to each of the plurality of processes, if the process is confirmed to be executable by two or more of the plurality of external apparatuses, changes the definition of the cooperative processing flow such that the process is preferentially executed by the external apparatus having the largest number of executable processes defined among the plurality of functions in the cooperative processing flow.

6. The image processing apparatus according to claim 1, wherein the cooperative processing flow further includes a reading condition for reading an image from an original, and
the image processing apparatus further comprises a reading unit that reads an image from an original in accordance with the reading condition included in the cooperative processing flow in order to generate the image data.

7. A method for controlling an image processing apparatus that is capable of executing image processing on image data in cooperation with a plurality of external apparatuses, the method comprising:
acquiring a cooperative processing flow in which contents of a plurality of processes to be executed on the image data and an external apparatus which executes each of the plurality of processes have been defined in advance from an external storage apparatus that manages the cooperative processing flow;
confirming, with respect to each of the plurality of processes included in the acquired cooperative processing flow, whether or not the function is executable by each of a plurality of external apparatuses defined in the cooperative processing flow;
changing, with respect to each of the plurality of processes, if the process is confirmed to not be executable by an external apparatus predefined in the cooperative processing flow to execute the process, the definition of the cooperative processing flow such that the process is to be executed by another external apparatus that has not been predefined in the cooperative processing flow to execute the process and has been confirmed to be capable of executing the process; and
causing cooperative processing to be executed in accordance with the definition of the cooperative processing flow changed in the changing step.

8. A non-transitory computer-readable storage medium storing a computer program for causing a computer to function as each unit of an image processing apparatus that is capable of executing image processing on image data in cooperation with a plurality of external apparatuses, the image processing apparatus comprising:
an acquiring unit that acquires a cooperative processing flow in which contents of a plurality of processes to be executed on the image data and an external apparatus which executes each of the plurality of processes have been defined in advance from an external storage apparatus that manages the cooperative processing flow;
a confirmation unit that, with respect to each of the plurality of processes included in the acquired cooperative processing flow, confirms whether or not the process is executable by each of a plurality of external apparatuses defined in the cooperative processing flow;
a changing unit that, with respect to each of the plurality of processes, if the process is confirmed to not be executable by an external apparatus predefined in the cooperative processing flow to execute the process, changes the definition of the cooperative processing flow such that the process is to be executed by another external apparatus that has not been predefined in the cooperative processing flow to execute the process and has been confirmed to be capable of executing the process; and
an execution control unit that causes cooperative processing to be executed in accordance with the definition of the cooperative processing flow changed by the changing unit.

* * * * *